US008614665B2

(12) United States Patent
Li

(10) Patent No.: US 8,614,665 B2
(45) Date of Patent: Dec. 24, 2013

(54) TOUCH SCREEN

(75) Inventor: Xintian Li, Cupertino, CA (US)

(73) Assignee: Qualcomm Innovation Center, Inc., San Diego, CA (US)

(*) Notice: Subject to any disclaimer, the term of this patent is extended or adjusted under 35 U.S.C. 154(b) by 351 days.

(21) Appl. No.: 12/950,662

(22) Filed: Nov. 19, 2010

(65) Prior Publication Data

US 2012/0127086 A1 May 24, 2012

(51) Int. Cl.
G09G 5/00 (2006.01)
G06F 3/041 (2006.01)
G06F 3/033 (2013.01)
G06F 3/048 (2013.01)
G09G 5/08 (2006.01)

(52) U.S. Cl.
USPC ........... 345/156; 345/157; 345/173; 715/856; 715/863

(58) Field of Classification Search
USPC ................... 345/156–184; 715/711, 856–863
See application file for complete search history.

(56) References Cited

U.S. PATENT DOCUMENTS

| 2002/0054172 A1* | 5/2002 | Berman et al. | 345/856 |
| 2006/0114225 A1* | 6/2006 | Tsukada et al. | 345/157 |
| 2010/0235793 A1* | 9/2010 | Ording et al. | 715/863 |
| 2010/0289757 A1* | 11/2010 | Budelli | 345/173 |
| 2011/0239153 A1* | 9/2011 | Carter et al. | 715/784 |

OTHER PUBLICATIONS

Apple Inc., iPad ios3 User Guide 2010, p. 19.

* cited by examiner

Primary Examiner — Alexander S Beck
Assistant Examiner — Nguyen H Truong
(74) Attorney, Agent, or Firm — Neugeboren O'Dowd PC

(57) ABSTRACT

One embodiment of the present invention comprises a mobile computing device comprising processing components, memory components, a wireless receiver/transmitter, and an electronic display. The electronic display is adapted to detect a location of a touch and comprises a first icon adapted to toggle the mobile computing device between a mobile computing device browsing mode and a mobile computing device editing mode, wherein the mobile computing device editing mode comprises a second icon comprising a first element and a second element. The first element is adapted to select one or more objects displayed on the electronic display and display a menu. The second element is adapted to move the second icon, change editing mode functions, establish an editing start position, and establish an editing end position.

16 Claims, 8 Drawing Sheets

TOUCH SCREEN

FIELD OF THE INVENTION

The present invention relates to touch screens. In particular, but not by way of limitation, the present invention relates to a method of operating a touch screen of a mobile computing device.

BACKGROUND OF THE INVENTION

Viewing and browsing content on devices comprising electronic displays that can detect the presence and location of a touch within the display area (i.e., a "touch screen") is superior in many aspects to viewing and browsing through content on devices not comprising a touch screen. However, it may be more difficult to perform certain functions on a touch screen, as compared to devices that do not comprise a touch screen.

For example, in some touch screen devices, editing functions are difficult and cumbersome to perform on the touch screen. In order to perform the editing of documents, for example, a cursor must often be placed in a desired location on the document that is displayed on the touch screen. It can be difficult to properly place the cursor because the cursor may be located under the finger on the touch screen, and therefore, the exact location of the cursor on the touch screen may be unknown until the person lifts his or her finger from the touch screen. Oftentimes, when a person does lift his or her finger, the cursor is in an unsuitable location for editing, thereby requiring a cursor replacement with the finger.

Furthermore, once the cursor is in a proper location, it is often difficult to select text since many touch screens fail to provide the functionality typically provided with mouse buttons in non-touch screen devices. Similarly, once text or any other object is selected, it is difficult to choose a desired editing action due to the lack of mouse buttons. Additionally, the editing functionality that many touch screens currently provide is often cumbersome to use.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the invention may be characterized as a method of using a mobile computing device touch screen. Not that although the term "mobile computing device" is used throughout the application, the term "mobile computing apparatus" may be used interchangeably. One method comprises selecting a first object on the touch screen. Selecting the first object may change a mobile computing device operating state from a first mobile computing device operating state to a second mobile computing device operating state. Furthermore, upon selecting the first object, a second object on the mobile computing device touch screen may be displayed, with the second object being adapted to (i) receive user input corresponding to the second mobile computing device operating state, and (ii) operatively change what is displayed on the mobile computing device touch screen. The method may further comprise re-selecting the first object on the mobile computing device touch-screen, which (i) returns the mobile computing device operating state to the first operating state, and (ii) removes the second object from the mobile computing device touch-screen.

Another embodiment of the invention may be characterized as a mobile computing device touch screen. One mobile computing device touch screen comprises a first object. The first object comprises a first mode adapted to place the mobile computing device touch screen in a first operating state. The first object also comprises a second mode adapted to place the mobile computing device touch screen in a second operating state. The mobile computing device touch screen also comprises a second object in the second operating state. The second object comprises (i) a first element adapted to be precisely located on the mobile computing device touch screen, and (ii) a second element adapted to receive a fingertip without covering the first element.

Yet another embodiment of the invention may be characterized as a mobile computing device comprising processing components, memory components, a wireless receiver/transmitter, and an electronic display adapted to detect a location of a touch on the electronic display. The electronic display comprises a first icon adapted to toggle the mobile computing device between a mobile computing device browsing mode and a mobile computing device editing mode. The mobile computing device editing mode comprises a second icon having a first element and a second element. The second icon comprises a first element adapted to (i) select one or more objects displayed on the electronic display, and (ii) display a menu. The second icon also comprises a second element adapted to (i) move the second icon, (ii) change editing mode functions, (iii) establish an editing start position, and (iv) establish an editing end position.

And another embodiment of the invention may be characterized as a non-transitory, tangible computer-readable storage medium, encoded with processor-readable instructions to perform a method of operating a mobile computing device touch screen. One method comprises touching a first object on the mobile computing device touch screen a first time, changing from a first mobile computing device operating mode to second mobile computing device operating mode, and displaying a second object on the mobile computing device touch screen, wherein the second object comprises a first element and a second element. The method further comprises touching the mobile computing device touch screen at a first location, moving the second object to the first location, and dragging the second object to a second location. The second element may then be touched and dragged to a third location. The second element may then be touched again. The first element may then be touched a first time, displaying a menu, and a menu selection may be chosen.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
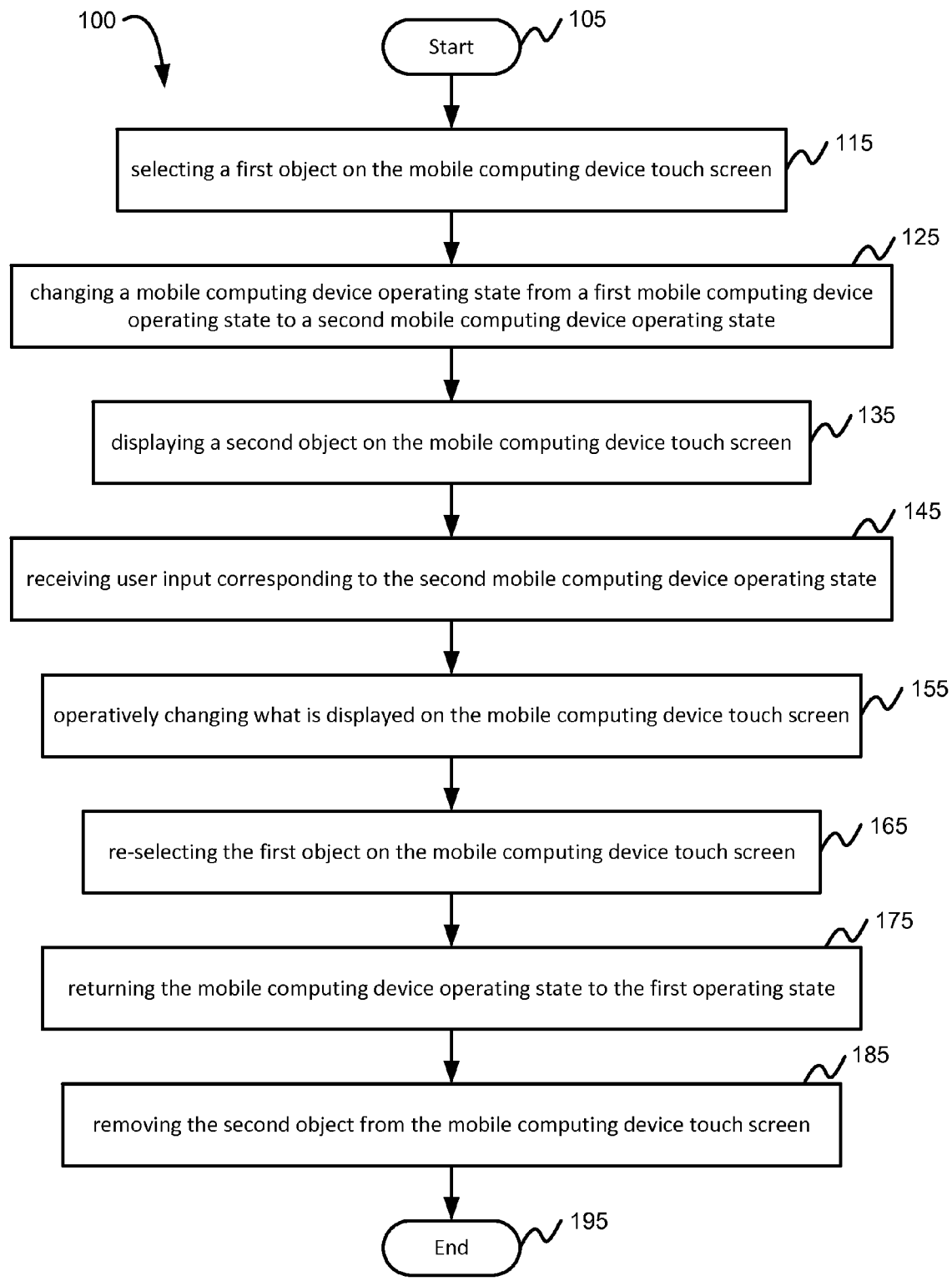
FIG. 1 is a flowchart that depicts a method that may be carried out in connection with the embodiments described herein.
Figure 2:
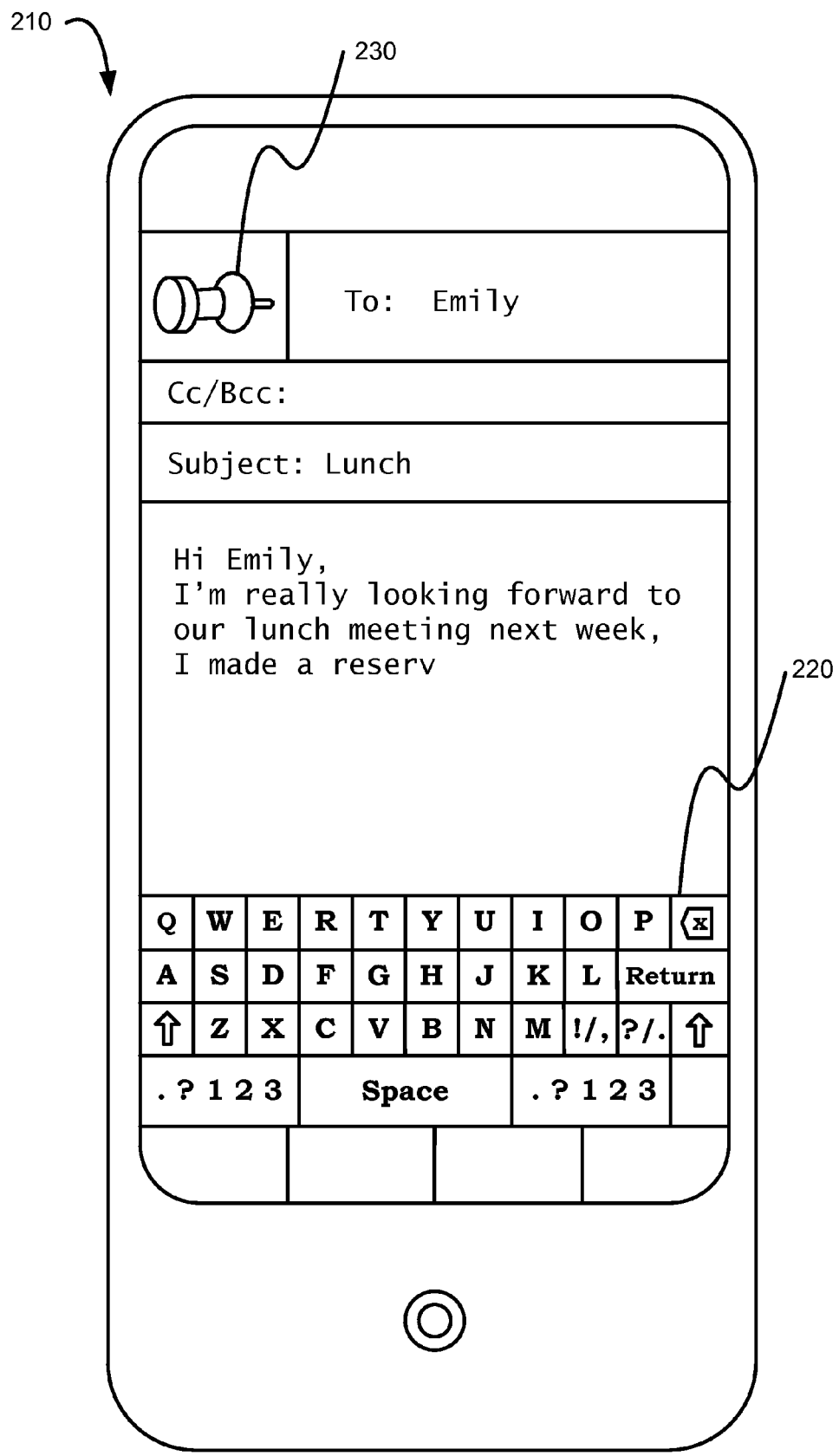
FIG. 2 illustrates a mobile computing device touch screen according to an exemplary embodiment of the present invention.

FIG. 1 shows one embodiment of the present invention comprising a method 100 of using a mobile computing device touch screen. One method 100 starts at 105 and at 115 comprises selecting a first object on the mobile computing device touch screen. Seen in FIG. 2 is a mobile computing device 210 comprising a touch screen 220, with a first object 230 being displayed on the touch screen 220. The first object 230 may be displayed on the touch screen 220 upon turning on the mobile computing device 210. Alternatively, the first object 230 may be displayed when certain applications are launched—such as, but not limited to, when word processing, email, and other text-based applications are launched. In one embodiment, the mobile computing device 210 may operate in a first mode when the first object 230 is initially displayed. For example, one first mode may comprise a typical mobile computing device 210 operating state adapted to allow the mobile computing device 210 to, for example, place calls and operate applications such as, but not limited to, drafting an email in an email application as seen in FIG. 2. The first mode may also be referred to as a browsing mode and may be adapted to allow the viewing of on-line content in an internet application. The mobile computing device operating mode may also be referred to as a mobile computing device operating state.

Figure 3:
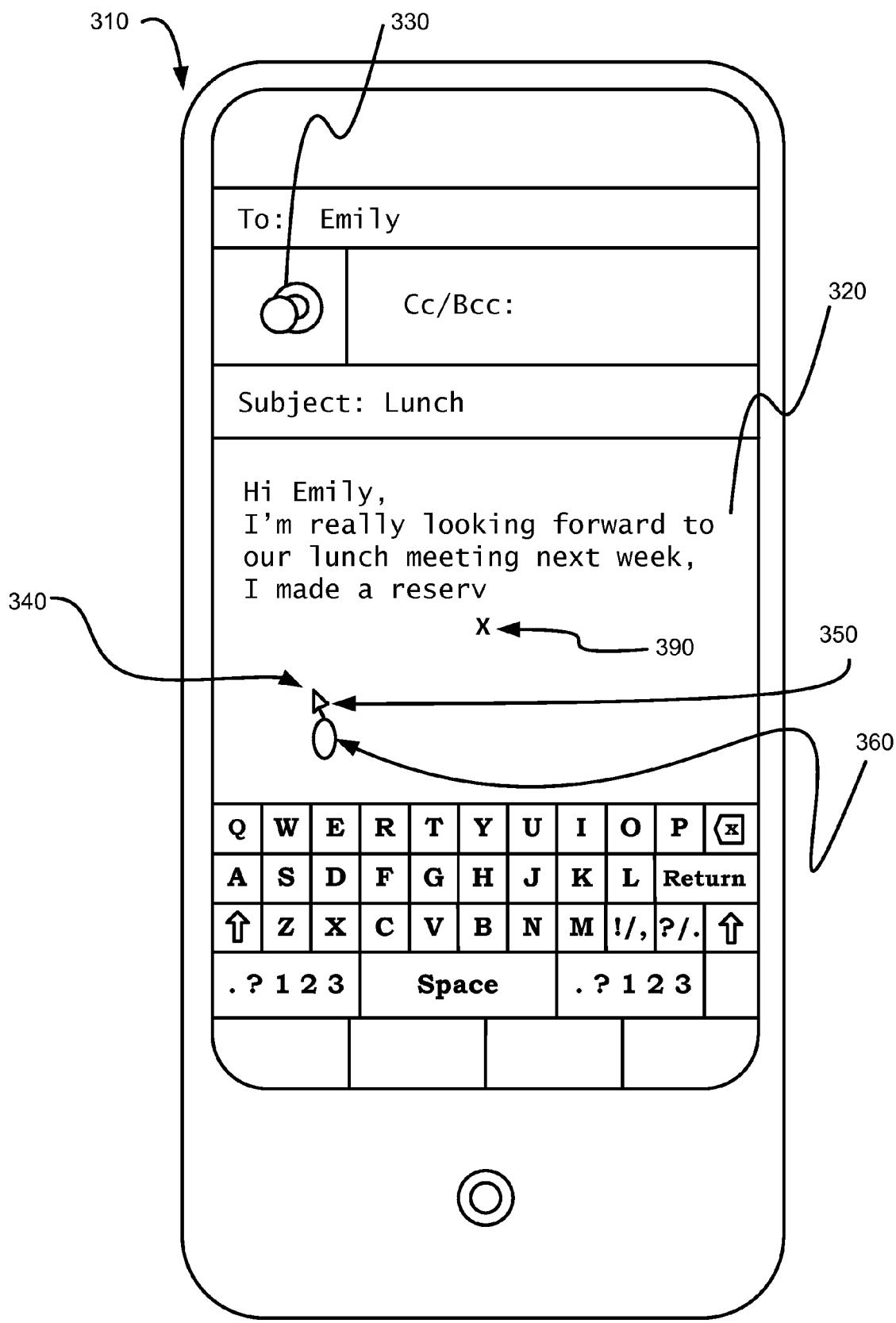
FIG. 3 illustrates a mobile computing device touch screen according to an exemplary embodiment of the present invention.
Figure 5:
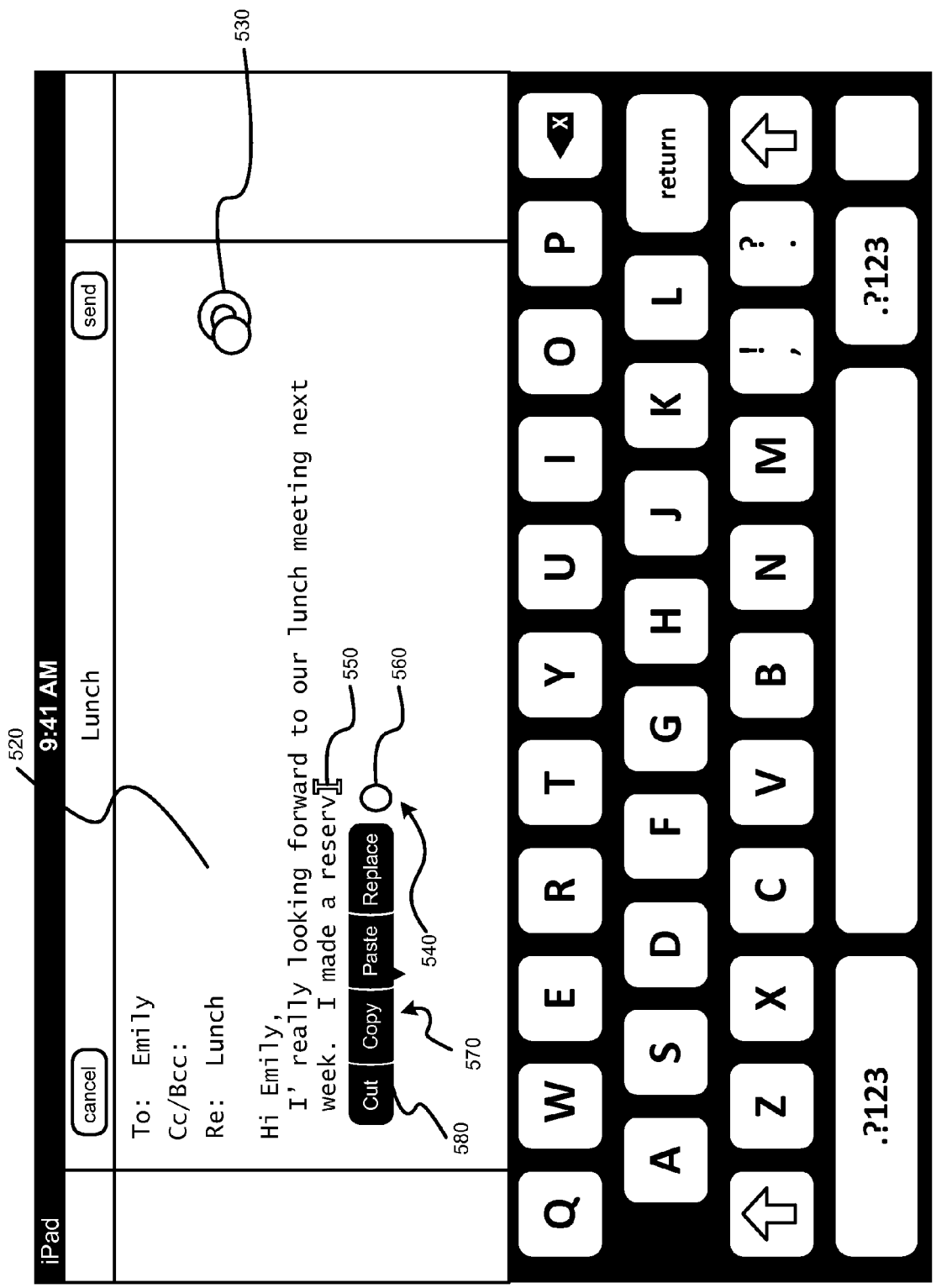
FIG. 5 illustrates a mobile computing device touch screen depicting a first object, a second object, and a menu of an exemplary embodiment of the present invention.

One first object 230 may comprise a push pin icon and selecting the first object 230 may comprise a person touching the first object 230 with a finger or a stylus on the touch screen 220. Touching the first object 230 may change the mobile computing device 210 from operating in the first operating state to the mobile computing device 210 operating in a second operating state, as seen at 125 of the method 100. In one method 100, the second operating state may comprise an editing mode. Touching the first object 230 may also cause the display of a second object on the mobile computing device touch screen 220, as seen at 135 of the method 100. For example, seen in FIG. 3 is one second object 340 displayed on the touch screen 320. One second object 340 may be initially displayed at any location on the touch screen 320. However, it may be important to display the second object 340 at a location that does not affect the functionality of any other object on the touch screen 220, such as, but not limited to, a soft keypad. In one embodiment, and as seen at 145 of the method 100, one second object 340 is adapted to receive user input corresponding to the second operating state. For example, when the second operating state is an editing mode, as seen in FIG. 5, the second object 540 may comprise a first element 550 and a second element 560, and touching the first element 550 may launch a menu 570 comprising editing functions 580. The menu 570 may be displayed to the left of the second element 560. The editing functions 580 may also be referred to as editing selections. It is to be appreciated that throughout the application, where the term "touch" or any variation thereof is used, the appropriate variation of the term "tap" may be used in its place, where appropriate, and/or unless otherwise specified. A tap may constitute a brief touch of the touch screen 520, while a touch may constitute holding the touch on the touch screen 520 for a longer period than the tap. At 155, the second object 540 may also be adapted to operatively change what is displayed on the mobile computing device touch screen 520. For example, the second object 540 may display the menu 570 and choosing one or more of the menu selections 580 may further modify the display of the touch screen 520.

As seen in FIGS. 1 and 3, at 165, the method 100 comprises re-selecting the first object 330 on the mobile computing device touch screen 320. At 175, re-selecting the first object 330 returns the mobile computing device operating state to the first operating state, as seen in FIG. 3. At 185, re-selecting the first object 330 removes the second object 340 from the mobile computing device touch screen 320. FIG. 2 also displays a mobile computing device 210 with the second object 340 removed from the touch screen 220. In returning to the mobile computing device first state, the first object 230 may change from the first object 330 in a second state as seen in FIG. 3 to the first object 230 in a first state, as seen in FIG. 2. One first object 330 second state may be a fully-inserted push-pin as seen in FIG. 3 and one first object 230 first state may comprise a partially-inserted push-pin, as seen in FIG. 2. One method 100 ends at 195.

One method 100 may comprise further steps. For example, as seen in FIG. 3, after the first object 330 has been selected and the second object 340 is displayed, a user may touch the mobile computing device touch screen 320 at a first location 390. While in the second mode, upon touching the touch screen 320 at the first location 390, the mobile computing device 310 may be adapted to move the second object 340 to the first location 390. As seen in FIG. 3, the second object 340 may comprise a first element 350 and a second element 360. The first element 350 may initially comprise an arrow icon and the second element 360 may comprise a trackball icon. Upon touching the first location, 390, the mobile computing device 310 may be adapted to move the second element 360 to the first location 390, with the first element 350 being placed proximal the first location 390. In other embodiments, the second object 340 may be initially displayed at the first location 390. One first location 390 comprises a location immediately below a blinking text cursor.

Figure 4:
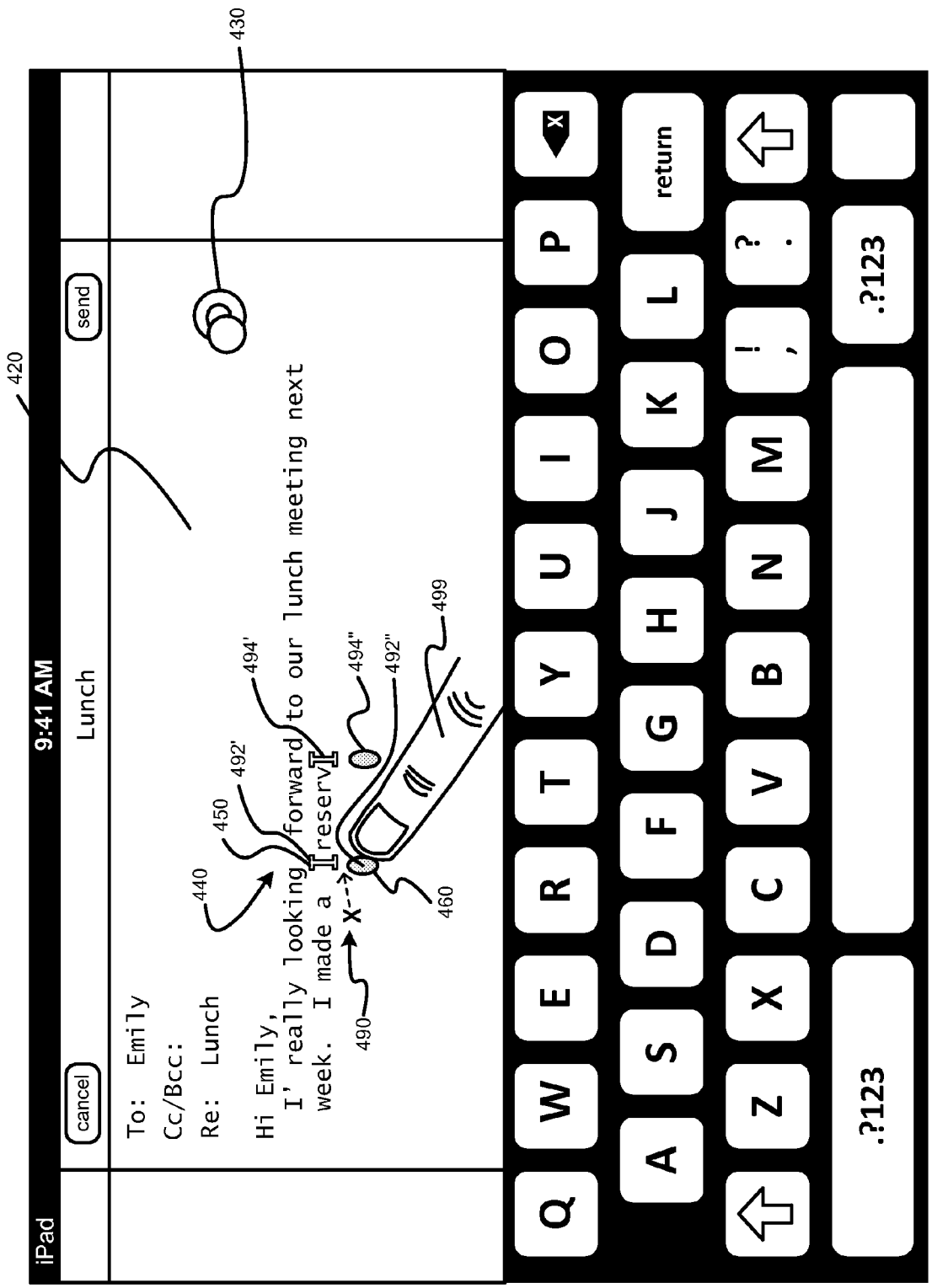
FIG. 4 illustrates a mobile computing device in a second mode according to an exemplary embodiment of the present invention.

One method 100 may further comprise placing the second object 340 in a second location on the mobile computing device touch screen 320. Seen in FIG. 4 is a first element second location 492' and a second element second location 492". For ease of description, however, the first and second element second locations 492', 492" may simply be referred to as the second location. In order to move the second object 440 from the first location 490 to the second location, a person may touch the first location 490 and wait for the second object 440 to be displayed at, or moved to, the second location from the original location. It is also contemplated that the second location comprises the first location 490.

In one embodiment, upon the second element 460 being displayed under the person's finger 499 at the first location 490, a user may apply a track-ball touching method to move the second element 460 to the second element second location 492". For example, the user may touch the second element 460 with a finger and slide the finger towards the second element second location 492", lift the finger, and then slide the finger towards the second element in a series of slide-and-lifts to move the second object 440 to the desired location. In one embodiment, it may be necessary to place the second element 460 in the second element second location 492" in order to place the first element 450 in the proper first element second location 492' for text editing. As seen, one second element 460 may be adapted to position the second object 440 at the second location while enabling the first element 450 to be seen and precisely placed in the proper first element second location 492' since the first element 450 is not covered up by the person's finger 499. Touching the second element 460 in moving the second element 460 to the second location 492" may comprise a first touch of the second element 460.

In another embodiment, the second object 440 may be placed in the second location by first tapping the first location 490 and removing the finger 499 from the touch screen 420 after the second object 440 is displayed at the original location seen in FIG. 3. The second object 440 may then move to the first location 490 and the second element 460 may then be touched and dragged to the second element second location 492". Furthermore, the second element 460 may be touched and dragged from the original location seen in FIG. 3 directly to the second location 492". However, the second location of the second object 440 seen in FIG. 4 may also comprise the original location seen in FIG. 3 so that second object 440 is not required to be moved being text editing.

Figure 6:
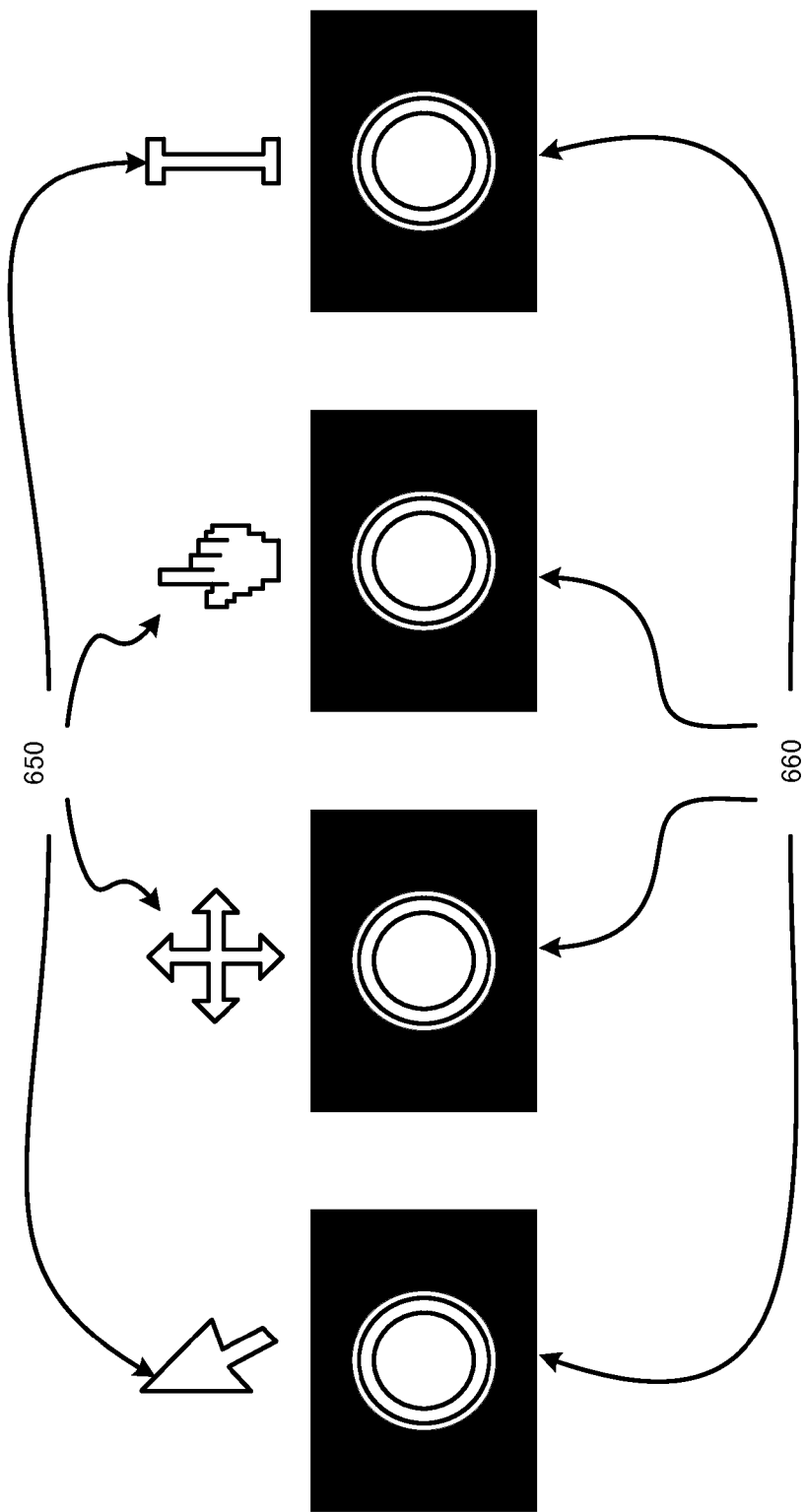
FIG. 6 illustrates various types of second object first elements according to an exemplary embodiment of the present invention.

It is to be appreciated that, at any point after the display of the second object 440, the second element 460 may be tapped to change the first element 450 from the original first element 450 such as, but not limited to the arrow pointing element icon seen in FIG. 3, to a different icon comprising the first element 450. Changing the icon comprising the first element 450 to a different first element 450 icon may also change the functionality of the first element 450. Seen in FIG. 6 are various types of first elements 650 associated with a second element 660. As seen, the first element 650 may comprise a cursor having a text selection functionality. The first element 650 may also comprise an arrow or a pointed finger icon having an object selection functionality. Also seen in FIG. 6 is a four-way arrow icon comprising abject movement functionality.

In one embodiment, upon the second element 460 reaching the second location 492", the second element 460 may then be touched to display the cursor as the first element 450, as seen in FIG. 4. Touching the second element 460 at the second location 492" may comprise the second touch of the second element 460. In one embodiment, after displaying the cursor in the first element 450, additional movement of the second object 440 will cause the highlighting of objects in the path of the movement of the cursor and displayed on the touch screen 420. For example, after changing the first element 450 to the cursor, the second element 460 may be dragged laterally across the text to a second element third location 494" (corresponding to a first element third location 494'), thereby highlighting the text between the first element second location 492' and third location 494". Upon reaching the desired third location 494", the finger 499 may be released from the second element 460 and the second element 460 may be touched again. Touching the second element 460 after highlighting one or more objects such as, but not limited to, text, may (i) comprise a third touch of the second element, (ii) selected the highlighted objects, such as, but not limited to, the highlighted text section, and (ii) display a menu 570 comprising menu selection 580 as seen in FIG. 5. The menu selections may be associated with the highlighted objects. The user may tap one of the menu selections 580, such as, but not limited to, a "copy" menu selection 580, and reposition the first element 550 at a new first element 550 location by touching and dragging the second element 560 to a corresponding new second element 560 location. One new location may comprise the fourth location 896 seen in FIG. 8. Upon reaching the new location, the first element 550 may be tapped, the menu 570 may be displayed, and a menu selection 580 may be chosen—such as, but not limited to, the "paste" menu selection 880 seen in FIG. 8. When the user is finished performing the menu selections 580 in the second operating mode, the user may then touch the first object 530 to remove the menu 570 and the second object 540 and return to the first operating mode, seen in FIG. 2.

Turning now to FIGS. 2 and 3, seen is one embodiment of the invention comprising the mobile computing device touch screen 220, 320. One mobile computing device touch screen 220, 320 comprises the first object 230, 330 and the second object 340. Seen in FIG. 2 is the first object 230 in a first mode. One first object 230 first mode may comprise the mode in which the first object 230 is initially displayed on the touch screen 220. The first object 230 first mode seen in FIG. 2 comprises a partially inserted pushpin. While the first object 230 is in the first mode, the mobile computing device 210 operates within the first operating state. The mobile computing device first operating state may also be referred to as the touch screen 220 first operating state. Seen in FIG. 3 is the first object 330 in a second mode—as an inserted pushpin. Selecting the first object 230 on the touch screen 220 of FIG. 2 may switch the first object 230 from the first mode of FIG. 2 to the second mode of FIG. 3. While the first object 330 is in the second mode, the mobile computing device 310 may operate in the second operating state. The mobile computing device 310 second operating state may also be referred to as the touch screen 320 second operating state.

The second object 340 displayed in the second mode comprises the first element 350 and the second element 360. The second element 360 is adapted to receive a fingertip without covering the first element 350. In one embodiment, the second object 340 may be moved on the touch screen 320 by touching second element 360 and sliding the second element 360 across the touch screen 320 before the finger is lifted off of the touch screen.

Figure 7:
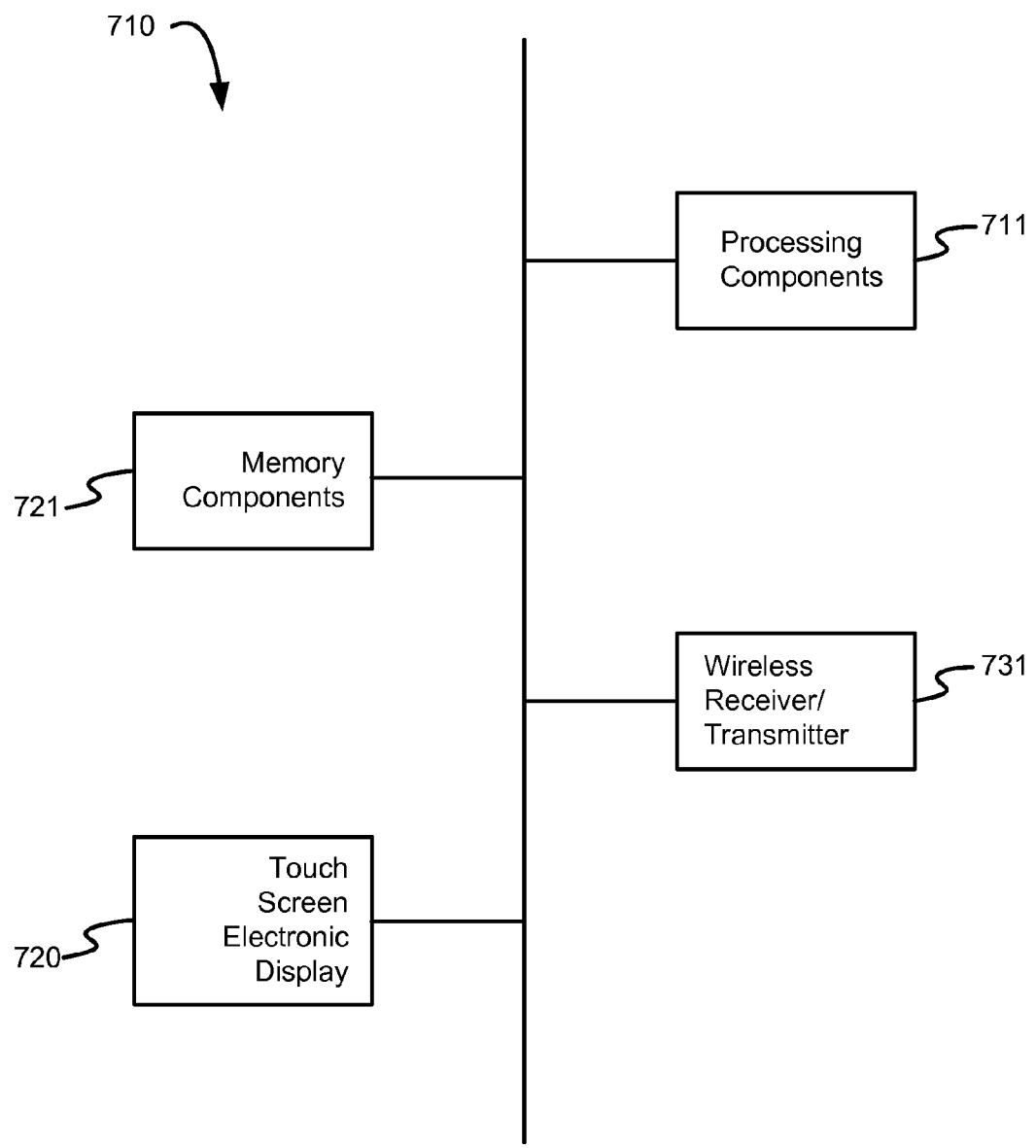
FIG. 7 illustrates a mobile computing device according to an exemplary embodiment of the present invention.

Seen in FIG. 7 is one embodiment of the invention comprising a mobile computing device 710. One mobile computing device 710 comprises processing components 711, memory components 721, a wireless receiver/transmitter 731, and an electronic display comprising a touch screen 720. The touch screen 720 is adapted to detect a location of a touch on the electronic display. As seen in FIG. 2, one touch screen 220 comprises the first object 230. The first object 230 may also be referred to as a first icon. One first icon is adapted to toggle the mobile computing device 710 between the first mobile computing device operating state such as, but not limited to a browsing mode and a second mobile computing device operating state such as, but not limited to, an editing mode. For example, selecting the first icon by touching the icon a first time may switch the mobile computing device from the first mode, seen in FIG. 2 to the second mode, seen in FIG. 3. Touching the first icon a second time while in the second mode of FIG. 3 may return the mobile computing device 710 to the first mode of FIG. 2. As seen in FIG. 3 the mobile computing device 310 second operating state comprises a second icon that may comprise the second object 340 having a first element 350 and a second element 360.

As described above with reference to the second object 540 in FIG. 5, systematically touching and dragging the second icon may (i) select one or more objects on the touch screen 520, (ii) display a menu 570 comprising one or more editing functions 580, and (iii) select at least one of one or more editing functions 580. In one embodiment, at least one touch of the second element 560 changes the functionality and icon of the first element 550, with examples of first element 650 icons seen in FIG. 6. Each first element 650 icon may comprise an editing feature having an editing function. For example, one first element 550 icon may comprise a cursor icon as seen in FIG. 5 which may be adapted to be placed within, and select, text. As described above with reference to FIG. 4, through properly placing the second icon on the touch screen 420, touching the second element 460 on the second element icon a first time and properly re-positioning the second object 440, at least one object on the touch screen 420, such as, but not limited to, text on the touch screen 420, may be selected with the second object 440. For example, a user may position the first element 450 at the second location 492', touch the second element 450 icon to indicate a text editing start position, slide the second element 460 to the third location 494", and touch the second element 460 icon again to indicate a text editing end position.

One embodiment of the invention may also comprise a non-transitory, tangible computer-readable storage medium, encoded with processor-readable instructions to perform a method of using the mobile computing device touch screen 420. One method of using the touch screen 420 comprises touching the first object 430 on the touch screen 420 a first time and changing from the first mobile computing device operating mode to second mobile computing device operating mode. The method further comprises displaying the second object 440 on the mobile computing device touch screen 420, wherein the second object 440 comprises the first element 450 and the second element 460. The mobile computing device touch screen 420 is then touched at the first location 490 and the second object 440 moves to the first location 490. The second element 460 is then touched a first time and moved to the second location 492", at which time the second element 460 is touched a second time. This second touch of the second element 460 may comprise setting a text or other object editing start position. The second element 460 may then be moved to the third location 494", at which point the second element 460 is touched a third time, setting a text or other touch screen object editing end position. The first element 450 is then touched a first time, and the menu 570 seen in FIG. 5 is displayed. A menu selection 580 may then be chosen by touching at least one menu selection 580.

Figure 8:
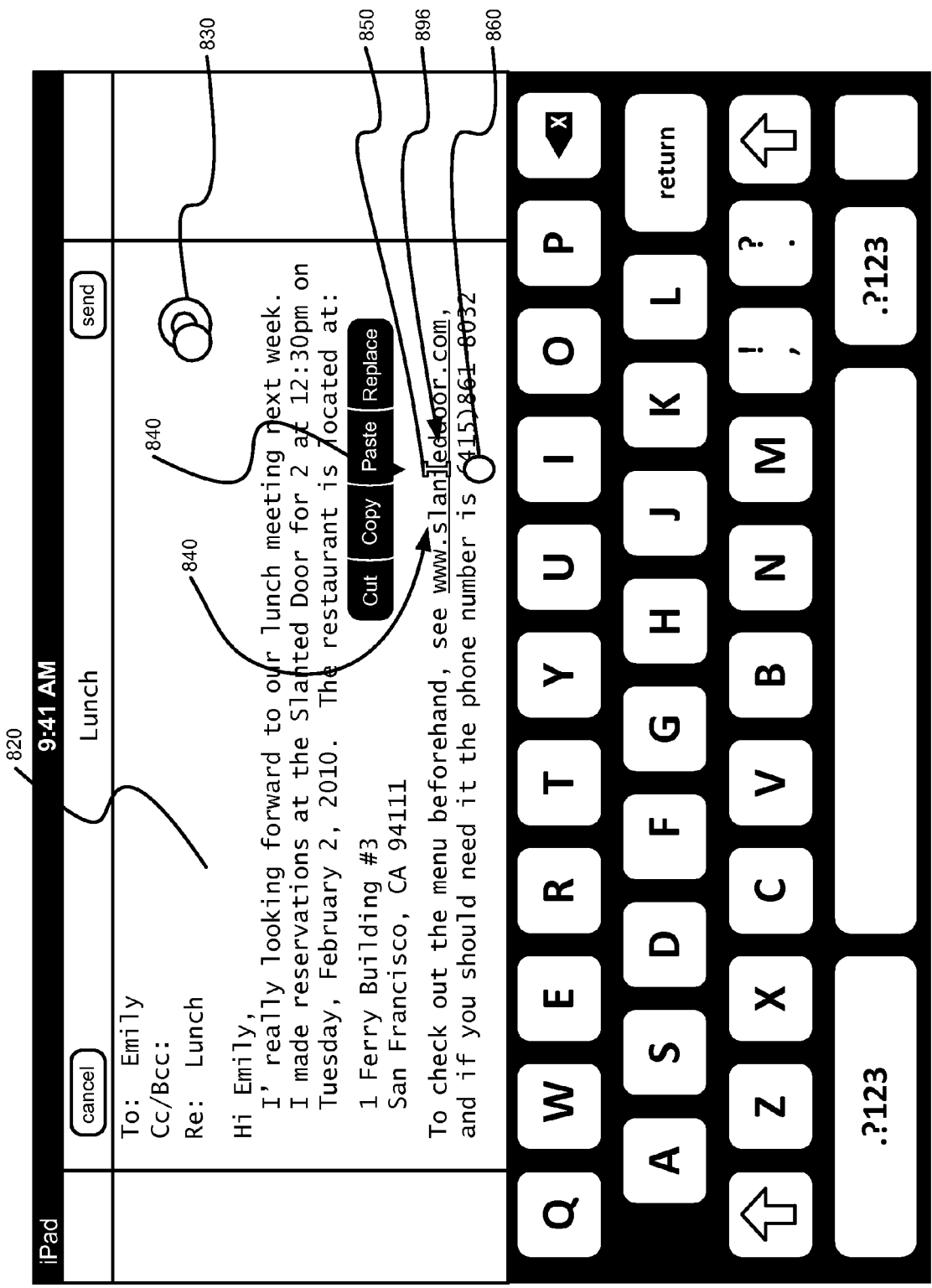
FIG. 8 illustrates a mobile computing device touch screen according to an exemplary embodiment of the present invention.

The method of using a mobile computing device touch screen 520 may further comprise dragging the second object 540 to a fourth location after choosing a menu selection 580. For example, seen in FIG. 8 is one fourth location 896. In one embodiment, the second element 860 of the second object 840 is touched a fourth time and dragged to the fourth location 896. Upon reaching the fourth location, the first element 850 may be touched a second time, which may display the menu 870 and allow a user to choose a menu selection 880 such, but not limited to, a paste menu selection 880. The method may further comprise touching the first object 830 on the mobile computing device touch screen 820 a second time and returning to the first mobile computing device operating mode.

In conclusion, embodiments of the present invention provide touch screen functions. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mobile computing device comprising,
processing components;
memory components;
a wireless receiver/transmitter; and
an electronic display,
    adapted to detect a location of a touch on the electronic display, and
    comprising a first icon adapted to,
        toggle the mobile computing device between,
            a first mobile computing device operating state, and
            a second mobile computing device operating state, and
    display a second icon upon activation of the second mobile computing device operating state, wherein, the second icon,
        comprises,
            a first element, and
            a second element, and
    is adapted to select one or more objects displayed on the electronic display by,
        changing the first element to a desired first element prior to movement of the first element occurring on the electronic display and in response to a tapping operation on the second element,
        changing a function of the first element from a first function to a second function,
        using the second element to position the second icon at a first location and a second location,
        touching the first element to display a menu comprising one or more menu options, and
        selecting at least one of the one or more menu options, and,
the second element is located proximal to the first element.

2. The mobile computing device of claim 1 wherein, the first icon is adapted to switch the mobile computing device from the,
    first mobile computing device operating state to the second mobile computing device operating state upon the first icon receiving a first touch; and
    second mobile computing device operating state to the first mobile computing device operating state upon the first icon receiving a second touch.

3. The mobile computing device of claim 1 wherein,
the second icon is moved upon receiving a first touch of the second element;
the editing start position is established upon receiving a second touch of the second element, and
the editing end position is established upon receiving a third touch of the second element.

4. A method of using a mobile computing device touch screen comprising,
selecting a first object on the mobile computing device touch screen, wherein selecting the first object,
    changes a mobile computing device operating state from a first mobile computing device operating state to a second mobile computing device operating state, and
    displays a second object on the mobile computing device touch screen upon activation of the second mobile computing device operating state, the second object,
comprising a first element and a second element, wherein,
    a portion of a display on the mobile computing device touch screen is selected by, changing the first element to a desired first element without substantial movement of the first element on the electronic display in response to a tapping operation on the second element, changing a function of the first element from a first function to a second function, positioning the second object at a first location, touching the second element a first time, dragging the second element from the first location to a second location, touching the second element a second time, and selecting a text section, being adapted to, receive user input corresponding to the second mobile computing device operating state, and operatively change what is displayed on the mobile computing device touch screen; and re-selecting the first object on the mobile computing device touch screen, wherein re-selecting the first object, returns the mobile computing device operating state to the mobile computing device first operating state, and removes the second object from the mobile computing device touch screen.

5. The method of claim 4 wherein, the first mobile computing device operating state comprises a browsing mode; and the second mobile computing device operation state comprises an editing mode.

6. The method of claim 4 further comprising, touching the first element; and displaying a menu.

7. The method of claim 6 wherein, the menu comprises at least one of, a copy selection, a cut selection, and a paste selection.

8. A mobile computing device touch screen comprising, a first icon comprising, a first mode adapted to place a mobile computing device in a first operating state, and a second mode adapted to place the mobile computing device in a second operating state; and a second icon, wherein the second icon is displayed upon activation of the second operating state, the second icon comprising, a first element adapted to, be changed from a first object to a second object prior to movement of the first element occurring on the electronic display and in response to a tapping operation on the second element, and select at least one object displayed on the mobile computing device touch screen upon changing a first element function from a first function to a second function, and a second element adapted to, position the second object, and receive a fingertip without covering the first element.

9. The mobile computing device touch screen of claim 8 wherein, the first object is adapted to switch between the first mode and the second mode upon the first object being selected on the touch screen.

10. The mobile computing device touch screen of claim 8 wherein, the first element adapted to be changed from a first object to a second object comprises, changing from one of, a text selection icon, at least one general selection icon, and a movement icon, to another of the text selection icon, at least one general section icon, and the movement icon.

11. The mobile computing device touch screen of claim 8 wherein, the second object is adapted to be positioned by, placing a fingertip on the second element; and dragging the second element.

12. A non-transitory, tangible computer-readable storage medium, encoded with processor readable instructions to perform a method of operating a mobile computing device touch screen comprising, touching a first object on the mobile computing device touch screen a first time;

changing from a first mobile computing device operating mode to second mobile computing device operating mode;

displaying a second object on the mobile computing device touch screen at a first location upon activation of the second mobile computing device operating state, wherein the second object comprises a first element and a second element;

changing the first element to a desired first element without substantial movement of the first element on the electronic display and in response to a tapping operation on the second element;

changing a function of the first element from a first function to a second function;

touching the second element a first time;

dragging the second object to a second location;

touching the second element a second time;

dragging the second object to a third location;

touching the second element a third time;

touching the first element a first time;

displaying a menu; and choosing a menu selection.

13. The non-transitory, tangible computer-readable storage medium, encoded with processor readable instructions of claim 12 wherein, choosing a menu selection comprises choosing one of a cut and a copy selection; and further comprising, touching the second element a fourth time;

dragging the second object to a fourth location;

touching the first element a second time;

displaying the menu; and choosing a paste menu selection.

14. The non-transitory, tangible computer-readable storage medium, encoded with processor readable instructions of claim 13 further comprising, touching the first object on the mobile computing device touch screen a secondtime; and returning to a first mobile computing device operating mode.

15. The mobile computing device of claim 1 wherein, changing the first element to a desired first element comprises, tapping the second element; and changing the first element from an original first element icon to a new first element icon.

16. The mobile computing device of claim 15 wherein, changing the first element from an original first element icon to a new first element icon comprises changing from one of an arrow, a cursor, a pointed finger, and a four-way arrow to another of the arrow, cursor, pointed finger and four-way arrow; and changing the function from a first function to a second function comprises changing from one of a text selection functionality, an objection selection functionality, and an object movement functionality to another of the text selection functionality, an objection selection functionality, and an object movement functionality.

* * * * *